(12) United States Patent
Tanaka (10) Patent No.: US 11,593,621 B2
(45) Date of Patent: Feb. 28, 2023

(54) INFORMATION PROCESSING APPARATUS, INFORMATION PROCESSING METHOD, AND COMPUTER PROGRAM PRODUCT

(71) Applicants: KABUSHIKI KAISHA TOSHIBA, Tokyo (JP); TOSHIBA DIGITAL SOLUTIONS CORPORATION, Kawasaki (JP)

(72) Inventor: Ryohei Tanaka, Kanagawa (JP)

(73) Assignees: KABUSHIKI KAISHA TOSHIBA, Tokyo (JP); TOSHIBA DIGITAL SOLUTIONS CORPORATION, Kawasaki (JP)

( * ) Notice: Subject to any disclaimer, the term of this patent is extended or adjusted under 35 U.S.C. 154(b) by 537 days.

(21) Appl. No.: 16/752,174

(22) Filed: Jan. 24, 2020

(65) Prior Publication Data

US 2020/0410325 A1  Dec. 31, 2020

(30) Foreign Application Priority Data

Nov. 29, 2018 (JP) .............................. JP2018-222996

(51) Int. Cl.
*G06N 3/04* (2006.01)
*G06K 9/62* (2022.01)
*G06F 17/18* (2006.01)

(52) U.S. Cl.
CPC ........... *G06N 3/0472* (2013.01); *G06F 17/18* (2013.01); *G06K 9/6215* (2013.01); *G06K 9/6223* (2013.01); *G06K 9/6256* (2013.01)

(58) Field of Classification Search
CPC .............................. G06N 20/00; G06K 9/6215
See application file for complete search history.

(56) References Cited

U.S. PATENT DOCUMENTS

2007/0098254 A1  5/2007  Yang et al.
2013/0191129 A1* 7/2013  Kurata .................... G10L 15/10
                                                         704/254

(Continued)

FOREIGN PATENT DOCUMENTS

JP           4429370 B2    12/2009
WO     WO 2014/136316 A1   9/2014

OTHER PUBLICATIONS

W. Hu, et al., "Learning Discrete Representations via Information Maximizing Self-Augmented Training", Proceedings of the 34th International Conference on Machine Learning, Proceedings of Machine Learning Research, vol. 70, pp. 1558-1567, Aug. 2017.

(Continued)

*Primary Examiner* — Ross Varndell
(74) *Attorney, Agent, or Firm* — Maier & Maier, PLLC (57) ABSTRACT

An information processing apparatus according to an embodiment includes one or more hardware processors. The hardware processors obtain a first categorical distribution sequence corresponding to first input data and obtain a second categorical distribution sequence corresponding to second input data neighboring the first input data, by using a prediction model outputting a categorical distribution sequence representing a sequence of L categorical distributions for a single input data piece, where, L is a natural number of two or more. The hardware processors calculate, for each i of 1 to L, an inter-distribution distance between i-th categorical distributions in the first and second categorical distribution sequences. The hardware processors calculate a sum of L inter-distribution distances. The hardware processors update the prediction model's parameters to lessen the sum.

8 Claims, 6 Drawing Sheets

(56) References Cited

U.S. PATENT DOCUMENTS

| | | |
|---|---|---|
| 2016/0012351 A1 | 1/2016 | Sato |
| 2018/0061439 A1* | 3/2018 | Diamos .................. G10L 15/24 |
| 2018/0260737 A1 | 9/2018 | Tanaka |
| 2019/0164014 A1 | 5/2019 | Tanaka |

OTHER PUBLICATIONS

U.S. Appl. No. 16/533,853, filed Aug. 7, 2019, Ryohei Tanaka.

* cited by examiner

INFORMATION PROCESSING APPARATUS, INFORMATION PROCESSING METHOD, AND COMPUTER PROGRAM PRODUCT

CROSS-REFERENCE TO RELATED APPLICATIONS

This application is based upon and claims the benefit of priority from Japanese Patent Application No. 2018-222996, filed on Nov. 29, 2018; the entire contents of which are incorporated herein by reference.

FIELD

Embodiments described herein relate generally to an information processing apparatus, an information processing method, and a computer program product.

BACKGROUND

In order to enhance the generalization capability of a prediction model or to enable semi-supervised learning, a technique is known for smoothing posterior probability distributions by updating the parameters of the prediction model in such a way that the inter-distribution distances among the posterior probability distributions for training data and the neighboring points thereof are minimized. A posterior probability distribution is the probability distribution of an output that is conditioned to a particular input. The state in which a posterior probability distribution is smooth indicates the state in which, when two pieces of data are close in the data space, the corresponding posterior probabilities are also similar.

However, in this method, in the case of handling sequential data, there is an increase in the calculation load for calculating the inter-distribution distances, and it takes a significant amount of time to perform the processing. Hence, regarding a prediction model that handles sequential data, there is a demand for enabling smoothing of the posterior probability distributions with a smaller amount of calculations, so as to enable achieving enhancement in the generalization capability and enable semi-supervised learning.

DETAILED DESCRIPTION

An information processing apparatus according to an embodiment includes one or more hardware processors. The hardware processors obtain a first categorical distribution sequence corresponding to first input data and obtains a second categorical distribution sequence corresponding to second input data that is in the vicinity of the first input data, by using a prediction model that outputs a categorical distribution sequence representing a sequence of L number of categorical distributions with respect to a single piece of input data, where, L is a natural number equal to or greater than two. The hardware processors calculate, for each i ranging from 1 to L, an inter-distribution distance between an i-th categorical distribution in the first categorical distribution sequence and an i-th categorical distribution in the second categorical distribution sequence. The hardware processors calculate a sum of L number of inter-distribution distances. The hardware processors update parameters of the prediction model in such a way that the sum lessens. It is an object of embodiments to provide an information processing apparatus, an information processing method, and a computer program product that, regarding a prediction model that handles sequential data, enable smoothing of posterior probability distributions with only a small amount of calculations.

The embodiments of the information processing apparatus, the information processing method, and the computer program product are described below in detail with reference to the accompanying drawings.

Overview of Embodiments

The embodiments are related to the technology that enables achieving enhancement in the generalization capability of a prediction model and enables semi-supervised learning by performing smoothing of posterior probability distributions; and particularly enables, regarding a prediction model that handles sequential data, smoothing of posterior probability distributions of the prediction model with only a small amount of calculations. A prediction model represents a parameter set and a computation method used in predicting labels for the input data, and is generated/learnt by updating the parameter set so as to make advance statistical correlation between a plurality of pieces of data and labels.

As far as a method for generating/learning a prediction model is concerned, supervised learning or semi-supervised learning is known. The supervised learning is a learning method in which all pieces of data to be used in learning (i.e., training data) are assigned with class labels. The semi-supervised learning is a learning method in which the training data is made of a mixture of data assigned with class labels (i.e., labeled data) and data not assigned with class labels (i.e., unlabeled data). The conventional Virtual Adversarial Training is smoothing posterior probability distributions by updating the parameters of a prediction model in such a way that the inter-distribution distances between the training data and the neighboring points in the posterior probability distributions are minimized.

Figure 1:
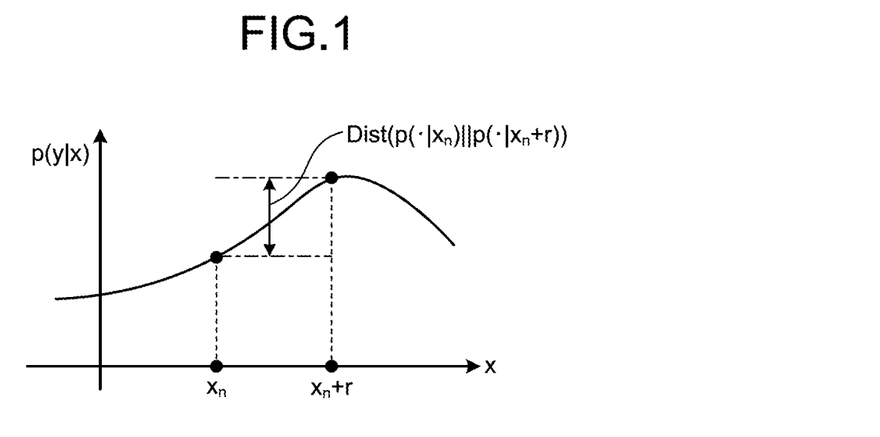
FIG. 1 is a diagram for explaining the smoothing of posterior probability distributions.

The smoothing of posterior probability distributions performed using the conventional Virtual Adversarial Training is explained below with reference to FIG. 1. In FIG. 1, a posterior probability distribution p(y|x) of a prediction model is virtually and one-dimensionally illustrated in the vertical axis direction, and the data space of input data x (i.e., the input data space) is one-dimensionally illustrated in the horizontal axis direction. In the Virtual Adversarial Training, in order to ensure that the posterior probability distribution p(y|x) of the prediction model becomes smooth in the neighborhood of training data $x_n$, an inter-distribution distance $Dist(p(\cdot|x_n)||p(\cdot|x_n+r))$ is calculated between a posterior probability distribution $p(\cdot|x_n)$ that is predicted by the prediction model when the training data $x_n$ is provided as input and a posterior probability distribution $p(\cdot|x_n+r)$ that is predicted by the prediction model when the training data $x_n+r$ neighboring the training data $x_n$ is provided as input; and the parameters of the prediction model are updated in such a way that the inter-distribution distance $Dist(p(\cdot|x_n)||p(\cdot|x_n+r))$ is minimized.

In the Virtual Adversarial Training, the class label of the training data $x_n$ is not required for the purpose of smoothing the posterior probability distributions of the prediction model. That is, the Virtual Adversarial Training serves as semi-supervised learning in which unlabeled data can be used as the training data $x_n$.

Figure 2A:
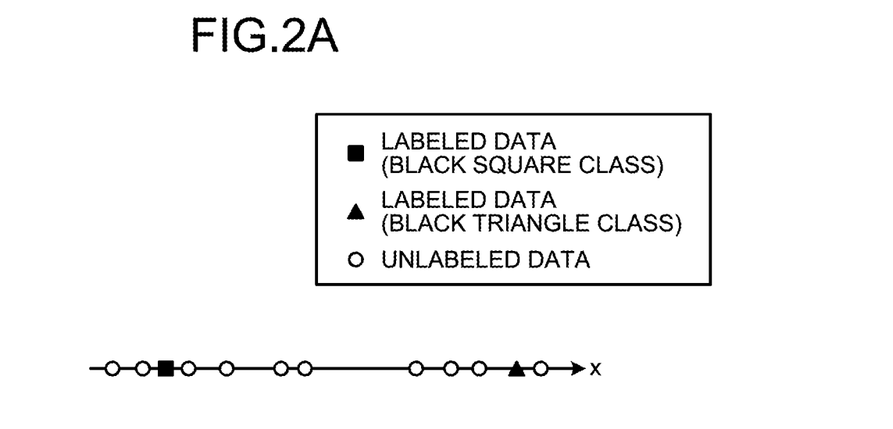
FIG. 2A is a diagram for explaining the effects achieved as a result of smoothing a posterior probability distribution.
Figure 2B:
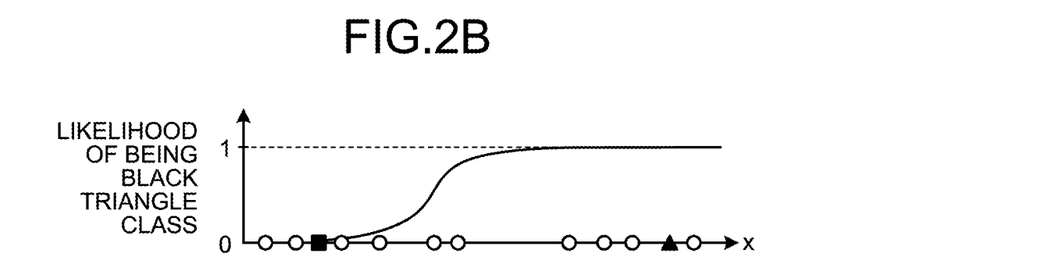
FIG. 2B is a diagram for explaining the effects achieved as a result of smoothing a posterior probability distribution.
Figure 2C:
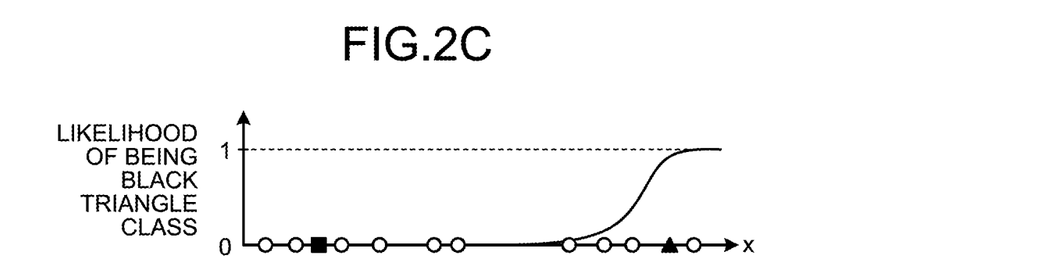
FIG. 2C is a diagram for explaining the effects achieved as a result of smoothing a posterior probability distribution.

FIGS. 2A to 2D are diagrams for explaining the effects achieved as a result of smoothing a posterior probability distribution. Herein, for ease of explanation, an example is given about class separation into two classes, namely, a black square class and a black triangle class. Moreover, in the input data space (illustrated one-dimensionally in the horizontal axis direction in an identical manner to FIG. 1), it is assumed that, for example, training data is present as illustrated in FIG. 2A. At that time, if a prediction model is generated by performing supervised learning in which only the labeled data is used, then the position of change (identification boundary) of the posterior probability distribution of that prediction model is sometimes either skewed toward the labeled data assigned with the class label of the black square as illustrated in FIG. 2B or skewed toward the labeled data assigned with the class label of the black triangle as illustrated in FIG. 2G.

Figure 2D:
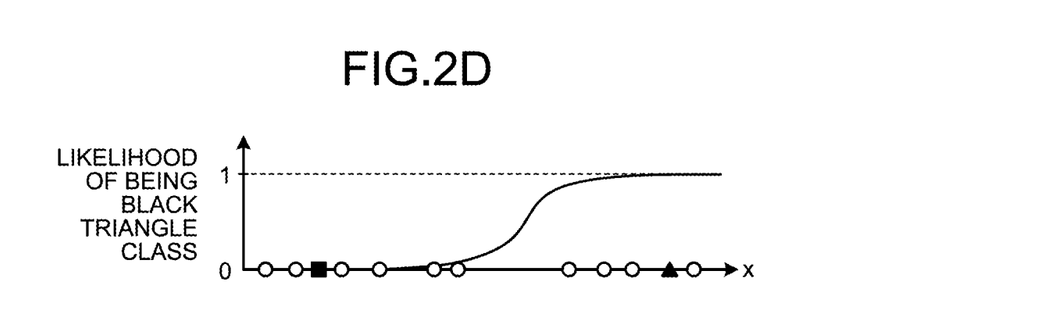
FIG. 2D is a diagram for explaining the effects achieved as a result of smoothing a posterior probability distribution.

On the other hand, if unlabeled data is included in the training data and if smoothing of the posterior probability distribution is performed using the Virtual Adversarial Training, then the posterior probability distribution of the prediction model gets smoothed in the neighborhood of each set of unlabeled data; and resultantly the prediction model gets optimized in such a way that, as illustrated in FIG. 2D, the posterior probability distribution undergoes a significant change in that space in the input data space in which the training data is sparse. As a result, it becomes possible to obtain a prediction model that is robust against the noise and that has high generalization capability.

Thus, the Virtual Adversarial Training is an effective method for achieving enhancement in the generalization capability of the prediction model. However, when sequential data is treated as the target, there arises the issue of intensive load required for calculating the posterior probability distributions and the inter-distribution distances. That is, in the problem of predicting a single label, the posterior probability distributions represent the categorical distributions of the class count $N_c$, and it is not difficult to obtain the posterior probability distributions and the inter-distribution distances. However, in the problem of predicting a label sequence such as in text recognition or speech recognition, the posterior probability distributions represent the categorical distributions of the combinations of all label sequence. Since the combinations of label sequence increase in an exponential manner with respect to the sequence length, an enormous amount of calculations is required for calculating the posterior probability distributions and the inter-distribution distances.

A categorical distribution is a probability distribution expressed below in Equation (1).

$$p(y) = \Pi_{i<N_c} \pi_i^{y_i} \quad (1)$$

Herein, $y=\{y_0, y_1, \ldots, y_{Nc-1}\}$ represents a one-hot $N_c$-dimensional vector in which only one element is "1" and the remaining elements are "0"; and $\pi_i$ represents a parameter satisfying $\Sigma_{i<N_c}\pi_i=1$ and $\pi_i \geq 0$. Moreover, $N_c$ represents the category count. A categorical distribution is also called a category distribution.

Figure 3:
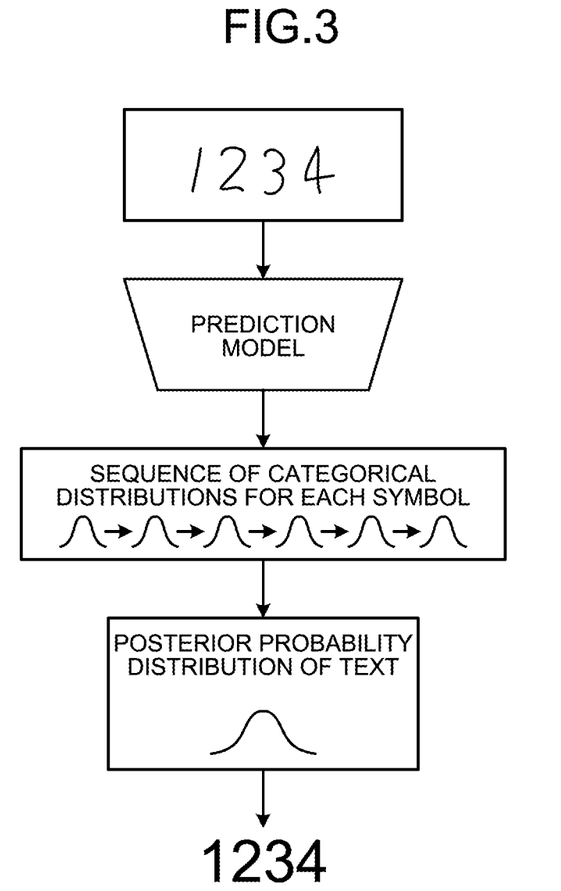
FIG. 3 is a diagram for explaining the overview of text recognition.

FIG. 3 is a diagram for explaining the overview of text recognition. In the text recognition, as illustrated in FIG. 3, a text image is input as input data x to a prediction model. The prediction model extracts L number of feature vectors from the input text image; calculates the categorical distribution for each of L number of symbols including blank symbols and successive symbols; and outputs a sequence of categorical distributions. Then, using a connectionist temporal classification (CTC) decoder (described later), the sequence of symbol-based categorical distributions is converted into a posterior probability distribution of a text, and a text is predicted according to maximum likelihood estimation.

Herein, when the prediction model outputs a sequence $p^c_1, \ldots, p^c_L$ of $N_c$-class categorical distributions that include blank class, a posterior probability distribution $p^w(w)$ of a text w can be calculated as given below in Equation (2).

$$p^w(w) := \sum_{S \in B^{-1}(w)} p^s(S) \quad (2)$$

$$p^s(S) := \prod_{i \leq L} p^c_i(s_i)$$

Herein, $S=s_1, \ldots, s_L$ represents a label sequence including blanks; $p^c_i(k)$ represents the probability of a label k ($0 \leq k < N_c$) in the categorical distribution $p^c_i$; and B represents the CTC decoder. The CTC decoder represents the operation of converting the input label sequence having the length L into a label sequence having an arbitrary length equal to or smaller than the length L, and implies removal of blanks and successive labels from the input label sequence. For example, if "-" represents a blank label, then B("-aa-b-b")="abb" holds true. Moreover, when L=3 holds true, then $B^{-1}$ ("ab")=\{"aab", "abb", "-ab", "a-b", "ab-"\} holds true.

When two categorical distribution sequence $p^c_1, \ldots, p^c_L$ and $q^c_1, \ldots, q^c_L$ are provided, a KL divergence $D_{KL}(p^w||q^w)$ between a posterior probability distribution $p^w$ of the text corresponding to the categorical distribution sequence $p^c_1, \ldots, p^c_L$ and a posterior probability distribution $q^w$ of the text corresponding to the categorical distribution sequence $q^c_1, \ldots, q^c_L$ can be obtained as given below in Equation (3). The KL divergence is an index known to be a type of the inter-probability distance.

$$D_{KL}(p^w||q^w) := \sum_{w \in D^w} p^w(w) \log \frac{p^w(w)}{q^w(w)} \quad (3)$$

Herein, $D^w$ represents the set of label sequence that, using the CTC decoder ("B" mentioned earlier), can be obtained by conversion from the label sequence having the length L and including blanks. Since the set $D^w$ has the element count equal to $O(N_c^L)$, the calculation cost becomes extremely high.

In that regard, in the embodiments, the focus is on the fact that the posterior probability distributions of a label sequence are expressed using the product and the sum of a plurality of small-scale categorical distributions. The sum of the inter-distribution distances among the small-scale categorical distributions limits the upper bound of the distances among the posterior probability distributions of the label sequence. Hence, by minimizing the sum, it becomes possible to achieve approximative minimization (i.e., optimization) of the inter-distribution distances among the proper posterior probability distributions. Since the distances among the small-scale categorical distributions can be calculated at low cost, the posterior probability distributions can be approximately smoothed at low cost on the whole.

That is, in the embodiments, Equation (4) given below is minimized.

$$\sum_{i \leq L} D_{KL}(p_i^c \| q_i^c), \quad (4)$$

where $$D_{KL}(p_i^c \| q_i^c) := \sum_{k < Nc} p_i^c(k) \log \frac{p_i^c(k)}{q_i^c(k)}. \quad (5)$$

That is because, generally, Equation (6) given below holds true.

$$D_{KL}(p^w \| q^w) \leq \sum_{i \leq L} D_{KL}(p_i^c \| q_i^c) \quad (6)$$

In order to obtain the KL divergence $D_{KL}(p^w \| q^w)$, it is necessary to perform the four arithmetic operations and logarithmic arithmetic for $O(N_c^L)$ number of times. In contrast, Equation (7) given below can be obtained by performing the four arithmetic operations and logarithmic arithmetic for only $O(N_c \times L)$ number of times.

$$\sum_{i \leq L} D_{KL}(p_i^c \| q_i^c) \quad (7)$$

As described above, in the embodiments, at the time of smoothing the posterior probability distributions of a prediction model that predicts a label sequence, the parameters of the prediction model are updated to achieve minimization of the sum of the inter-distribution distances among a plurality of small-scale categorical distributions representing the constituent elements of the posterior probability distributions, instead of minimizing the inter-distribution distances among the posterior probability distributions of the label sequence. As a result, smoothing of the posterior probability distributions can be achieved at a fast rate and with a small amount of calculations, and it becomes possible to achieve enhancement in the generalization capability of the prediction model and to enable semi-supervised learning.

First Embodiment

Figure 4:
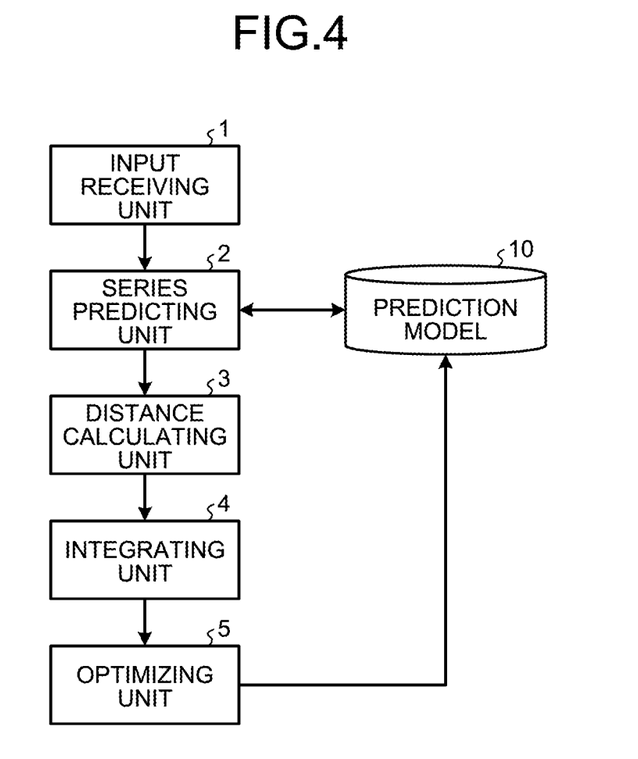
FIG. 4 is a block diagram illustrating an exemplary functional configuration of an information processing apparatus according to a first embodiment.

FIG. 4 is a block diagram illustrating an exemplary functional configuration of the information processing apparatus according to a first embodiment. In a recognition system that performs recognition of sequential data using a prediction model 10, the information processing apparatus according to the first embodiment performs smoothing of the posterior probability distributions of the prediction model 10 in the neighborhood of training data, and enables achieving enhancement in the generalization capability of the prediction model 10. As the functional constituent elements for enabling smoothing of the posterior probability distributions of the prediction model 10, the information processing apparatus includes an input receiving unit 1, a sequence predicting unit 2, a distance calculating unit 3, an integrating unit 4, and an optimizing unit 5 as illustrated in FIG. 4.

The input receiving unit 1 receives input of arbitrary training data. The training data can be unlabeled data. Herein, the training data received by the input receiving unit 1 is called "first input data". In the case of text recognition, the first input data is a text image. In the case of speech recognition, the first input data is audio data.

The sequence predicting unit 2 uses the prediction model 10 and obtains a sequence of categorical distributions corresponding to the input data. The prediction model 10 outputs, with respect to a single piece of input data, a categorical distribution sequence representing the sequence of L number of categorical distributions (where L is a natural number equal to or greater than two). Herein, the number L varies depending on the length of the input data. In the case of a text image, the length of the input data implies, for example, the image size (the pixel count) in the text direction. In the case of speech recognition, the length of the input data implies, for example, the time. The sequence predicting unit 2 receives the first input data from the input receiving unit 1; inputs the first input data to the prediction model 10; and obtains a first categorical distribution sequence corresponding to the first input data. Moreover, the sequence predicting unit 2 generates data that is in the neighborhood of the first input data, that is, generates data (hereinafter, called "second input data") that is close to the first input data in the input data space; inputs the second input data in the prediction model 10; and obtains a second categorical distribution sequence corresponding to the second input data. The second input data has an identical length to the first input data, and thus has L number of corresponding categorical distributions.

The distance calculating unit 3 calculates, for each i ranging from 1 to L, the inter-distribution distance between the i-th categorical distribution in the first categorical distribution sequence and the i-th categorical distribution in the second categorical distribution sequence. That is, the distance calculating unit 3 calculates the inter-distribution distances, equal in number to the count L representing the element count (the sequence length) of the sequence, between the categorical distributions having the same index (position) in the respective sequence among the first categorical distribution sequence and the second categorical distribution sequence.

The integrating unit 4 calculates the sum of the L number of inter-distribution distances calculated by the distance calculating unit 3, that is, calculates the sum of the inter-distribution distances of the categorical distributions having the same index (position) in the respective sequence among the first categorical distribution sequence and the second categorical distribution sequence.

The optimizing unit 5 updates the parameters of the prediction model 10 in such a way that the sum of the L number of inter-distribution distances as calculated by the distance calculating unit 3 becomes smaller, that is, the sum of the inter-distribution distances of the categorical distributions having the same index (position) in the respective sequence, among the first categorical distribution sequence and the second categorical distribution sequence, becomes smaller.

The following explanation is given about an example in which the information processing apparatus according to the first embodiment is implemented in a text recognition system that receives input of a text image and predicts the corresponding text; and a specific example of the operation of smoothing the posterior probability distributions of the prediction model 10 is explained in more detail. As described later, the feature vectors to be extracted from the input data is updated according to the recognition target. Hence, the information processing apparatus according to the first embodiment can also be easily implemented in a recognition system for some other sequential data, such as in a speech recognition system.

The prediction model 10 extracts, from an input image x, L number of feature vectors corresponding to a specific area. Herein, the count L is decided according to the length of the input image x along the text direction. In the case of speech recognition, the feature vectors can be substituted with acoustic feature vectors extracted from the audio in a specific section. The prediction model 10 having parameters $\theta$ regards the L number of feature vectors as sequential data, and outputs a categorical distribution sequence $p^c_1(\cdot|x, \theta), \ldots, p^c_L(\cdot|x, \theta)$, which represents the sequence of L number of categorical distributions, using a recurrent neural network.

A recurrent neural network is a neural network that has the function of outputting a single predicted value with respect to a single input, and has the function of maintaining the internal state for the next prediction. From the second time, the prediction is performed by using the original input as well as by using the internal state during the previous prediction. In the first embodiment, the prediction model 10 is assumed to be configured using a recurrent neural network that includes recursive integration in which neighboring categorical distributions in the output categorical distribution sequence $p^c_1(\cdot|x, \theta), \ldots, p^c_L(\cdot|x, \theta)$ affect each other.

Using the categorical distribution sequence $p^c_1(\cdot|x, \theta), \ldots, p^c_L(\cdot|x, \theta)$ output by the prediction model 10, the likelihood of the text w, which corresponds to the input image x, can be obtained using Equation (8) given below.

$$p^w(w|x, \theta) = \sum_{S \in B^{-1}(w)} \prod_{i \leq L} p^c_i(s_i | x, \theta) \quad (8)$$

In the case of updating the parameters $\theta$ of the prediction model 10 using supervised learning, a negative logarithmic likelihood $Loss_{s1}$ of the correct text with respect to all pieces of training data (labeled data) is used as the loss function, and the parameters $\theta$ are sequentially updated in such a way that the loss function becomes smaller. In the case of smoothing the posterior probability distributions of the prediction model 10, the parameters $\theta$ of the prediction model 10 are updated in such a way that not only the logarithmic likelihood $Loss_{s1}$ becomes smaller but the inter-distribution distance between the posterior probability distribution at the training data $x_n$ (first input data $x_1$) and the posterior probability distribution at a neighboring point $x_n + r$ (second input data $x_2$) also becomes smaller. If $Loss_{smooth}$ represents the sum of the inter-distribution distances of the posterior probability distributions at all pieces of training data $x_n$ and respective neighboring points $x_r + r$, then the parameters $\theta$ of the prediction model 10 are updated in such a way that eventually the logarithmic likelihood $Loss_{s1}$ as well as the sum $Loss_{smooth}$ is minimized.

In order to minimize the logarithmic likelihood $Loss_{s1}$ and the sum $Loss_{smooth}$, the respective parameters $\theta$ can be updated in an alternate manner, or can be updated with the total value given below serving as the new loss function.

$$Loss = Loss_{s1} + \lambda Loss_{smooth}$$

Herein, $\lambda$ represents a hyper-parameter given in advance.

Figure 5:
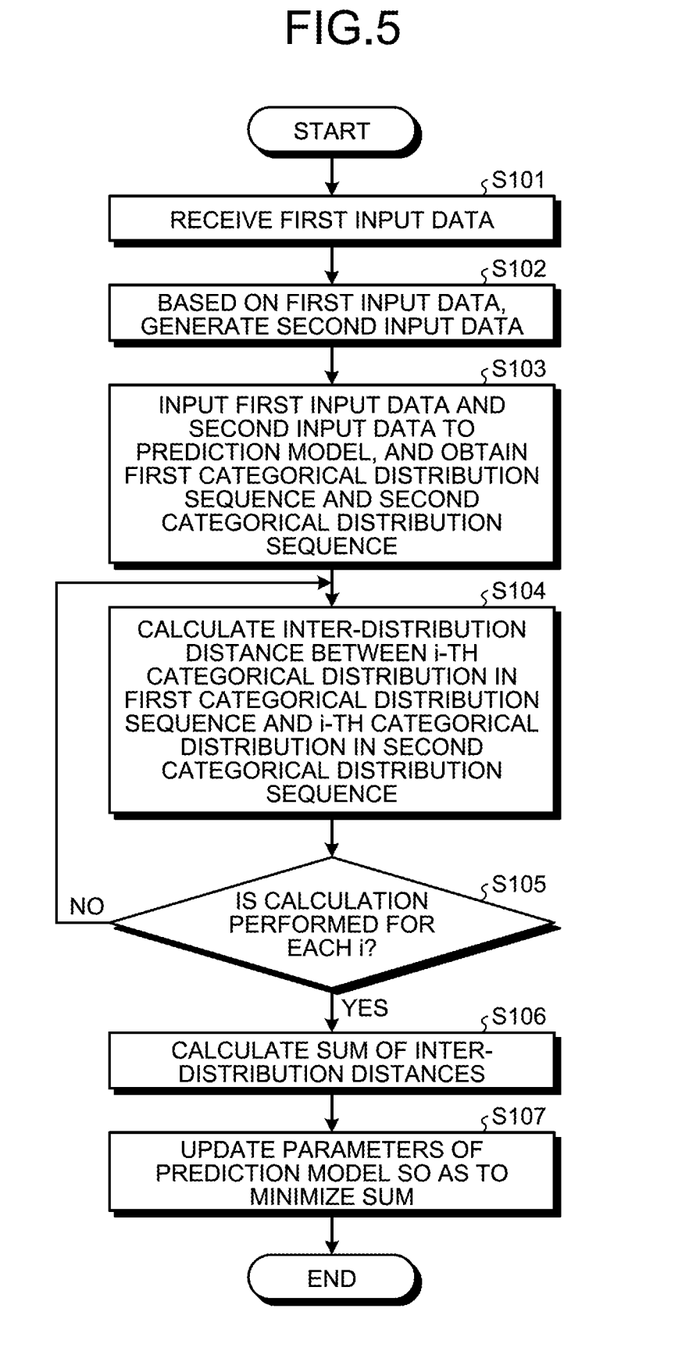
FIG. 5 is a flowchart for explaining the sequence of operations performed for smoothing the posterior probability distributions of a prediction model.

In the following explanation, it is assumed that updating the parameter $\theta$ for minimizing the logarithmic likelihood $Loss_{s1}$ and updating the parameter $\theta$ for minimizing the sum $Loss_{smooth}$ are alternately performed; and the series of operations performed in the information processing apparatus according to the first embodiment is explained with reference to FIG. 5. FIG. 5 is a flowchart for explaining the sequence of operations performed in the information processing apparatus according to the first embodiment for smoothing the posterior probability distributions of the prediction model 10. The sequence of operations illustrated in the flowchart in FIG. 5 is started when the input receiving unit 1 receives input of the training data (the first input data).

Once the sequence of operations illustrated in the flowchart in FIG. 5 is started, firstly, the sequence predicting unit 2 receives the first input data $x_1$ from the input receiving unit 1 (Step S101) and generates the second input data $x_2$ from the first input data $x_1$ (Step S102). The second input data $x_2$ is obtained as given below using a random vector d that has the same dimensionality as the first input data $x_1$ and using a hyper-parameter $E$ decided in advance.

$$x_2 = x_1 + \varepsilon \times d/|d|$$

Then, the sequence predicting unit 2 inputs the first input data $x_1$ to the prediction model 10 and obtains the first categorical distribution sequence $p^c_1(\cdot|x_1, \theta), \ldots, p^c_L(\cdot|x_1, \theta)$ representing the sequence of L number of categorical distributions corresponding to the first input data $x_1$; as well as inputs the second input data $x_2$ to the prediction model 10 and obtains the second categorical distribution sequence $p^c_1(\cdot|x_2, \theta), \ldots, p^c_L(\cdot|x_2, \theta)$ representing the sequence of L number of categorical distributions corresponding to the second input data $x_2$ (Step S103).

Subsequently, the distance calculating unit 3 calculates the inter-distribution distance between the i-th categorical distribution $p^c_i(\cdot|x_1, \theta)$ in the first categorical distribution sequence $p^c_1(\cdot|x_1, \theta), \ldots, p^c_L(\cdot|x_1, \theta)$ and the i-th categorical distribution $p^c_i(\cdot|x_2, \theta)$ in the second categorical distribution sequence $p^c_1(\cdot|x_2, \theta), \ldots, p^c_L(\cdot|x_2, \theta)$ (Step S104). Herein, in the case of calculating the KL divergence as the inter-distribution distance between categorical distributions, the inter-distribution distance $D_{DL}(p^c_i(\cdot|x_1, \theta)\|p^c_i(\cdot|x_2, \theta))$ is obtained using Equation (9) given below.

$$D_{KL}(p^c_i(\cdot|x_1, \theta)\|p^c_i(\cdot|x_2, \theta)) = \sum_{k < N_c} p^c_i(k|x_1, \theta) \log \frac{p^c_i(k|x_1, \theta)}{p^c_i(k|x_2, \theta)} \quad (9)$$

Herein, $N_c$ represents the class count including a blank class.

Until the inter-distribution distance $D_{KL}(p^c_i(\cdot|x_1, \theta)\|p^c_i(\cdot|x_2, \theta))$ is calculated for each $i=1 \sim L$ (No at Step S105), the distance calculating unit 3 repeatedly performs the calculation at Step S104. When the calculation at Step S104 is completed for each i (i.e., for all of "i"s) (Yes at Step S105), the integrating unit 4 calculates the sum of the L number of inter-distribution distances $D_{KL}(p^c_i(\bullet|x_1, \theta)\|p^c_i(\bullet|x_2, \theta))$ calculated at Step S104 (Step S106), and sets the sum as the sum $\text{Loss}_{smooth}$.

$$\text{Loss}_{smooth} = \Sigma_{i \leq L} D_{KL}(p^c_i(\bullet|x_1,\theta)\|p^c_i(\bullet|x_2,\theta)) \quad (10)$$

Lastly, the optimizing unit 5 updates the parameters θ of the prediction model 10 in such a way that the sum $\text{Loss}_{smooth}$ calculated at Step S106 is minimized (Step S107). It marks the end of the sequence of operations illustrated in the flowchart in FIG. 5. Herein, the parameters θ of the prediction model 10 can be updated using the stochastic gradient descent method, for example. That is, the sum $\text{Loss}_{smooth}$ calculated at Step S106 is differentiated with respect to each parameter θ of the prediction model 10 and, according to the corresponding derivative, the parameter θ is updated in such a way that the sum $\text{Loss}_{smooth}$ calculated at Step S106 becomes smaller.

As described above in detail with reference to a specific example, in the first embodiment, at the time of smoothing the posterior probability distributions of the prediction model in the neighborhood of the training data, the parameters of the prediction model 10 are updated to achieve minimization of the sum of the inter-distribution distances among a plurality of small-scale categorical distributions representing the constituent elements of the posterior probability distributions, instead of minimizing the inter-distribution distances among the posterior probability distributions of the training data and the neighboring points thereof. Thus, according to the first embodiment, as against the prediction model 10 that handles sequential data, it becomes possible to perform smoothing of the posterior probability distributions with a smaller amount of calculations, and it enables achieving enhancement in the generalization capability of the prediction model 10 and enables semi-supervised learning.

Second Embodiment

In a second embodiment, the method of obtaining the second input data $x_2$ is different than the method in the first embodiment. In the first embodiment, the second input data $x_2$ is randomly selected from the data that is away from the first input data $x_1$ by a specific distance ε in the input data space. In contrast, in the second embodiment, among the data that is away from the first input data $x_1$ by the specific distance ε in the input data space, the data having the maximum sum $\text{Loss}_{smooth}$ is selected as the second input data $x_2$.

In the second embodiment, among the data that is away from the first input data $x_1$ by the specific distance g in the input data space, the data that maximizes Equation (11) given below is selected as the second input data $x_2$.

$$F(x_2) = \Sigma_{i \leq L} D_{KL}(p^c_i(\bullet|x_1,\theta)\|p^c_i(\bullet|x_2,\theta)) \quad (11)$$

Such second input data $x_2$ can be obtained according to, for example, a conventionally available method. That is, the random vector d having the same dimensionality as the first input data $x_1$ is used as the initial value; and, using the random vector d obtained as a result of repeating following Equation (12) for $I_p$ number of times, the second input data $x_2$ can be approximately obtained using $x_2 = x_1 + \varepsilon \times d/|d|$.

$$d \leftarrow d/\|d\|$$

$$d \leftarrow \nabla F|_{x_2 = x_1 + \xi d} \quad (12)$$

Herein, ξ and $I_p$ are constant numbers given in advance. As described above, in the second embodiment, of the data that is away from the first input data $x_1$ by the specific distance ε in the input data space, the data that maximizes the sum $\text{Loss}_{smooth}$ is used as the second input data $x_2$. Hence, as compared to the first embodiment, although it needs advanced calculation, the parameters θ of the prediction model 10 can be expected to efficiently converge to proper values.

In the first and second embodiments, the distance ε between the first input data $x_1$ and the second input data $x_2$ is assumed to be decided in advance as a hyper-parameter. Alternatively, the distance ε can be mechanically obtained based on the distribution of the training data. That is, of a plurality of pieces of training data used in the training of the prediction model 10, a distance Dt between the t-th nearest training data to the first input data $x_1$ (where t represents an arbitrary natural number that is set in advance) and the first input data $x_1$ in the input data space can be used as the distance ε. In that case, the second input data $x_2$ represents the data that is away from the first input data $x_1$ by the distance Dt in the input data space. For example, obtaining the distance ε if t=10 is conventionally disclosed.

In this way, as a result of deciding the distance z between the first input data $x_1$ and the second input data $x_2$, smoothing of the posterior probability distributions of the prediction model 10 can be performed in a more efficient manner.

Third Embodiment

In a third embodiment, the method of calculating the inter-distribution distance between categorical distributions is different than the method in the first embodiment. That is, in the first embodiment, the KL divergence is employed as the inter-distribution distance between categorical distributions. In contrast, in the third embodiment, the square error is employed as the inter-distribution distance between categorical distributions.

In the third embodiment, the distance calculating unit 3 calculates, for each i ranging from 1 to L, a square-error-based inter-distribution distance $D_{SQ}(p^c_i(\bullet|x_1, \theta)\|p^c_i(\bullet|x_2, \theta))$ as the inter-distribution distance between the i-th categorical distribution $p^c_i(x_1, \theta)$ in the first categorical distribution sequence $p^c_i(\bullet|x_1, \theta), \ldots, p^c_L(\bullet|x_1, \theta)$ and the i-th categorical distribution $p^c_i(\bullet|x_2, \theta)$ in the second categorical distribution sequence $p^c_i(\bullet|x_2, \theta), \ldots, p^c_L(\bullet|x_2, \theta)$. The inter-distribution distance $D_{SQ}(p^c_i(\bullet|x_1, \theta)\|p^c_i(\bullet|x_2, \theta))$ is obtained using Equation (13) given below.

$$D_{SQ}(p^c_i(\bullet|x_1,\theta)\|p^c_i(\bullet|x_2,\theta)) = \Sigma_{k < N_c}(p^c_i(k|x_1,\theta) - p^c_i(k|x_2,\theta))^2 \quad (13)$$

Herein, $N_c$ represents the class count including blank class.

In the third embodiment, the integrating unit 4 calculates the sum of the L number of inter-distribution distances $D_{SQ}(p^c_i(\bullet|x_1, \theta)\|p^c_i(\bullet|x_2, \theta))$ calculated by the distance calculating unit 3, and sets the sum as the sum $\text{Loss}_{smooth}$.

$$\text{Loss}_{smooth} = \Sigma_{i < L} D_{SQ}(p^c_i(\bullet|x_1,\theta)\|p^c_i(\bullet|x_2,\theta)) \quad (14)$$

As described above, in the third embodiment, as the inter-distribution distances between categorical distributions, the square error is used instead of the KL divergence. Consequently, the gradient of the loss function becomes less steep, and the parameters θ of the prediction model 10 are likely to efficiently converge to more proper values.

Meanwhile, regardless of whether the KL divergence or the square error is used as the inter-distribution distances between categorical distributions, whether there is enhancement in the generality capability of the prediction model 10 depends on various factors such as the current performance of the prediction model 10 or the type of training data that is used. In that regard, the performance of the prediction model 10 in the case in which the parameters θ are updated using the KL divergence as the inter-distribution distance between categorical distributions as well as the performance of the prediction model 10 in the case in which the parameters θ are updated using the square error as the inter-distribution distance between categorical distributions can be evaluated using evaluation data, and the prediction model 10 with the higher evaluation value can be selected.

Supplementary Explanation

The information processing apparatus according to the embodiments described above can be implemented, for example, using a general-purpose computer as the basic hardware. That is, the functions of the constituent elements of the information processing apparatus can be implemented by making one of more processors installed in a general-purpose computer execute computer programs. The computer programs can be installed in advance in a computer; or can be stored in a computer-readable memory medium and installed in a computer; or can be distributed via a network and installed in a computer.

Figure 6:
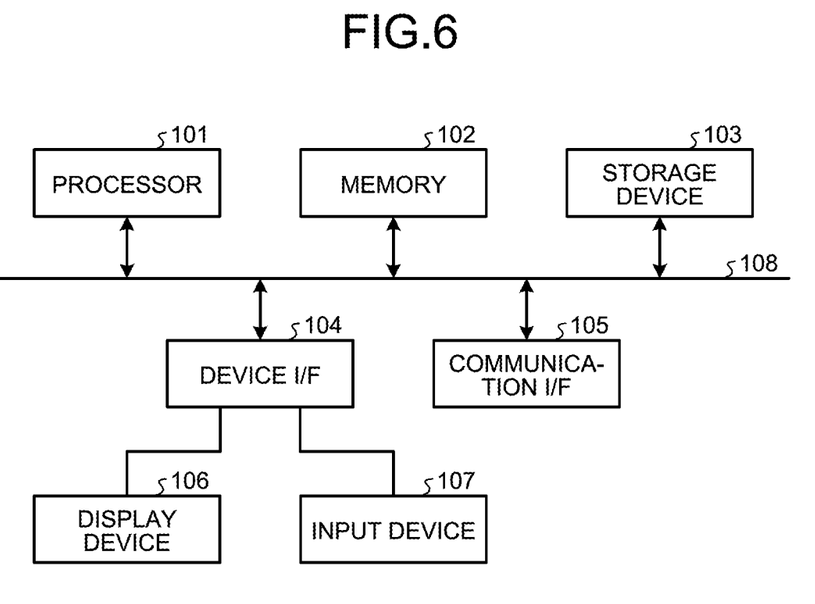
FIG. 6 is a block diagram illustrating an exemplary hardware configuration of the information processing apparatus according to embodiments.

FIG. 6 is a block diagram illustrating an exemplary hardware configuration of the information processing apparatus according to the embodiments described above. For example, as illustrated in FIG. 6, the information processing apparatus has the hardware configuration of a general-purpose computer that includes a processor 101 such as a central processing unit (CPU); a memory 102 such as a random access memory (RAM) or a read only memory (ROM); a storage device 103 such as a hard disk drive (HDD) or a solid state drive (SSD); a device interface (I/F) 104 that establishes connection with devices such as a display device 106, such as a liquid crystal panel, and an input device 107, such as a keyboard or a pointing device; a communication I/F 105 that performs communication with outside; and a bus 108 that connects the constituent elements with each other.

If the information processing apparatus according to the embodiments described above is implemented using the hardware configuration illustrated in FIG. 6, then, for example, the processor 101 can use the memory 102; read the computer programs stored in the storage device 103 and execute them; and implement the functions of the constituent elements such as the input receiving unit 1, the sequence predicting unit 2, the distance calculating unit 3, the integrating unit 4, and the optimizing unit 5. Moreover, for example, the prediction model 10 can be stored in, for example, the storage device 103 and can be read into the memory 102 such as the RAM, so that it can be used in the operations performed by the sequence predicting unit 2 and can be updated by the optimizing unit 5.

Meanwhile, some or all of the functions of the constituent elements of the information processing apparatus according to the embodiments described above can be implemented using dedicated hardware (a dedicated processor instead of a general-purpose processor) such as an application specific integrated circuit (ASIC) or a field-programmable gate array (FPGA). Alternatively, the functions of the constituent elements can be implemented using a plurality of processors. Meanwhile, the information processing apparatus according to the embodiments described above is not limited to be implemented using a single computer, and can alternatively be implemented in a dispersed manner among a plurality of computers.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An information processing apparatus comprising:
one or more hardware processors configured to:
obtain a first categorical distribution sequence corresponding to first input data and obtain a second categorical distribution sequence corresponding to second input data that is in the vicinity of the first input data, by using a prediction model that outputs a categorical distribution sequence representing a sequence of L number of categorical distributions with respect to a single piece of input data, L being a natural number equal to or greater than two, the second input data representing data that is away from the first input data by a specific distance in an input data space;
for each i ranging from 1 to L, calculate an inter-distribution distance between an i-th categorical distribution in the first categorical distribution sequence and an i-th categorical distribution in the second categorical distribution sequence;
calculate a sum of L number of inter-distribution distances; and
update parameters of the prediction model in such a way that the sum lessens.

2. The information processing apparatus according to claim 1, wherein the prediction model is configured using a recurrent neural network that includes recursive integration in which neighboring categorical distributions in the output categorical distribution sequence affect each other.

3. The information processing apparatus according to claim 1, wherein the hardware processors use a stochastic gradient descent method and update parameters of the prediction model in such a way that the sum lessens.

4. The information processing apparatus according to claim 1, wherein, of the data that is away from the first input data by the specific distance in the input data space, the second input data is data having the sum becoming maximum.

5. The information processing apparatus according to claim 1, wherein
the second input data is data that is away from the first input data by distance Dt in input data space, the distance Dt representing a distance between t-th nearest training data to the first input data and the first input data in the input data space, where t represents an arbitrary natural number that is set in advance, the t-th nearest training data being included in a plurality of pieces of training data used in learning the prediction model.

6. The information processing apparatus according to claim 1, wherein the hardware processors calculate, as the inter-distribution distance, KL divergence between categorical distributions or a square error between categorical distributions.

7. An information processing method, implemented by a computer, the method comprising:
   calculating a first categorical distribution sequence corresponding to first input data and calculating a second categorical distribution sequence corresponding to second input data that is in the vicinity of the first input data, by using a prediction model that outputs a categorical distribution sequence representing a sequence of L number of categorical distributions with respect to a single piece of input data, L being a natural number equal to or greater than two, the second input data representing data that is away from the first input data by a specific distance in an input data space;
   calculating, for each i ranging from 1 to L, an inter-distribution distance between an i-th categorical distribution in the first categorical distribution sequence and an i-th categorical distribution in the second categorical distribution sequence;
   calculating a sum of L number of inter-distribution distances; and
   updating parameters of the prediction model in such a way that the sum lessens.

8. A computer program product having a non-transitory computer readable medium including programmed instructions, wherein the instructions, when executed by a computer, cause the computer to perform:
   calculating a first categorical distribution sequence corresponding to first input data and calculating a second categorical distribution sequence corresponding to second input data that is in the vicinity of the first input data, by using a prediction model that outputs a categorical distribution sequence representing a sequence of L number of categorical distributions with respect to a single piece of input data, L being a natural number equal to or greater than two, the second input data representing data that is away from the first input data by a specific distance in an input data space;
   calculating, for each i ranging from 1 to L, an inter-distribution distance between an i-th categorical distribution in the first categorical distribution sequence and an i-th categorical distribution in the second categorical distribution sequence;
   calculating a sum of L number of inter-distribution distances; and
   updating parameters of the prediction model in such a way that the sum lessens.

* * * * *